J. S. BEALLE.
TRAP.
APPLICATION FILED JULY 26, 1917.
1,259,074.
Patented Mar. 12, 1918.
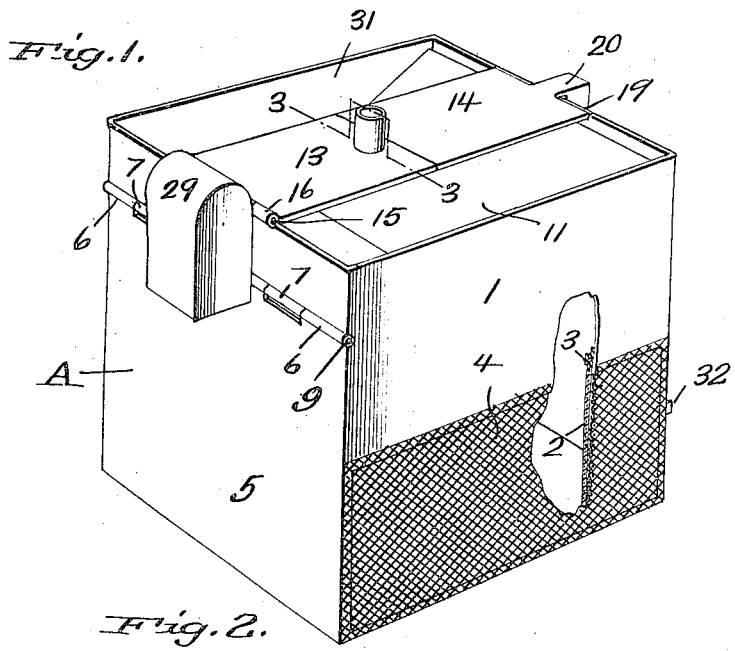
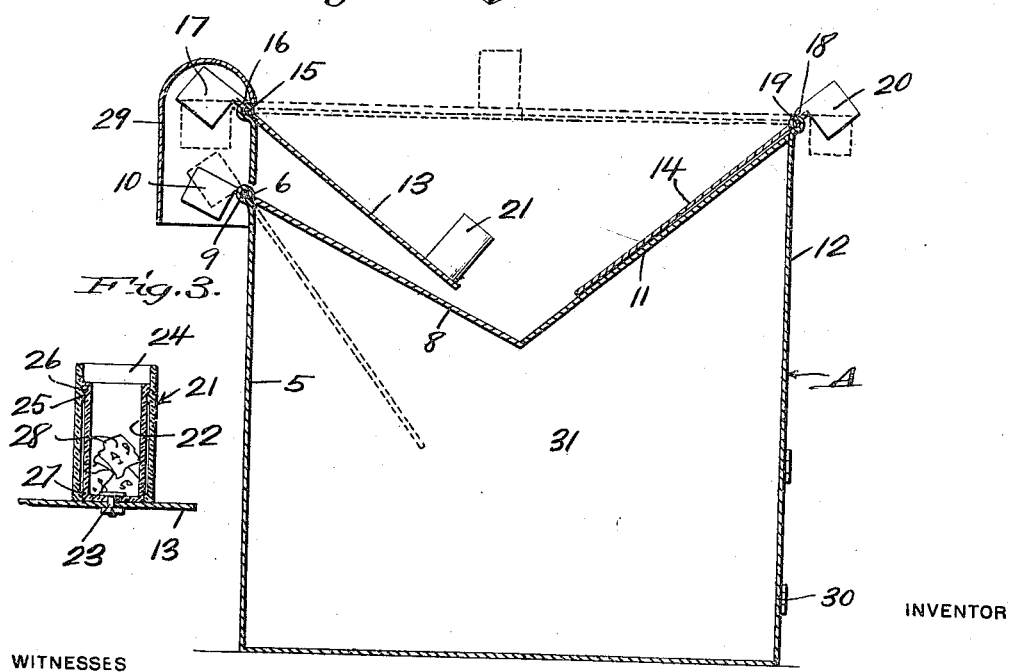
WITNESSES
INVENTOR
John Stockton Bealle,
BY
ATTORNEY

UNITED STATES PATENT OFFICE.

JOHN STOCKTON BEALLE, OF WALDORF, MARYLAND.

TRAP.

1,259,074.  Specification of Letters Patent.  Patented Mar. 12, 1918.

Application filed July 26, 1917.  Serial No. 183,008.

*To all whom it may concern:*

Be it known that I, JOHN STOCKTON BEALLE, a citizen of the United States, residing at Waldorf, in the county of Charles and State of Maryland, have invented certain new and useful Improvements in Traps, of which the following is a specification.

This invention relates to traps, and more particularly to a trap for catching rats and similar animals.

One of the main objects of the invention is to provide a trap of the character stated of simple construction and operation. A further object is to provide a trap having a tiltable member which carries the bait receptacle, this member being adapted to dump the animal into the trap when tripped. A further object is to provide simple and efficient means for positively preventing escape of the animal from the trap. Further objects will appear from the detailed description.

In the drawings:

Figure 1 is a front perspective view of a trap constructed in accordance with my invention:

Fig. 2 is a central transverse vertical sectional view through the trap:

Fig. 3 is a section taken substantially on line 3—3 of Fig. 1.

The trap is provided with a box-like casing A of sheet metal. This casing is provided in its front wall 1, at the lower portion thereof, with an opening extending the full width of the casing. This opening is closed by a pane of glass which is held in position by a sheet metal bead 3 secured to the inner face of front wall 1 and fitting about the upper edge portion of the glass.
This glass affords means whereby the interior of the trap may be readily observed. A screen 4 of comparatively heavy wire is secured to the front wall 1 of the casing A in front of the glass. This screen serves to protect the glass against breakage.

The casing A is provided, a short distance from the upper edge of side wall 5, with a plurality of equally spaced tabs which are rolled to provide spaced hinged sleeves 6.
To form these sleeves, a transverse slit is cut in side wall 5 a short distance from the upper edge thereof, the material of the side wall below this slit being cut to form spaced tabs which are turned downwardly and inwardly to provide the sleeves in the well known manner. These sleeves receive between them coöperating sleeves 7 which are formed at the upper edge of a downwardly and inwardly inclined closure plate 8. The sleeves 6 and 7, when properly alined receive the pintle 9 which hingedly secures the upper edge of plate 8 to side wall 5. This plate is normally held in raised position by a weight 10 secured to the outer end thereof beyond the side of the casing. Plate 8, when in raised position, abuts against the lower edge of a similarly inclined plate 11 fixedly secured between the front and back of the casing and side wall 12. The plates 8 and 11 form a hopper for the reception of animals discharged into the same, plate 8 being adapted to open inwardly so as to discharge the animals into the interior of casing A.

At the upper edge of casing A and extending the full width thereof, I provide a beam composed of two sections which are hingedly secured at their outer ends to the upper edges of the side walls of the casing so as to be tiltable downwardly into the casing. This beam is composed of the sections 13 and 14. Section 13 of the beam is provided, at its outer end, with a hinge-pin 15 secured thereto and projecting laterally into the hinge sleeves 16 formed at the upper edge of the side wall 5. By this means, section 13 of beam is hingedly secured to the upper edge of side wall 5, being normally held in horizontal position by a balance weight 17 secured to the outer end thereof. Beam section 14 is similarly secured to the upper edge of side wall 12 by means of the hinge-pin 18 and the coöperating sleeves 19, this section being normally held in horizontal position by a balance weight 20. If an animal advances a sufficient distance on either of the sections of the beam to raise the balance weight attached to the beam section, this section will tilt downwardly and inwardly so as to deposit the animal into the receiving hopper. The animal will fall against the closure plate 8 so as to force the same downwardly and inwardly and will fall into the interior of casing A, after which the closure plate will be returned to its initial position by weight 10, the beam sections 13 and 14 being returned to horizontal position by the weights 17 and 20, respectively, thus resetting the trap for the next animal.

At the inner end of beam section 13 I provide a specially constructed bait receptacle 21. An inner glass cylinder 22 is rotatably secured by a headed screw 23 inserted through the bottom of the same to beam section 13 adjacent to the inner end thereof. An outer casing 24 is mounted concentric with cylinder 22. This outer cylinder is provided with an inner annular shoulder 25 which fits beneath an annular flange 26 formed at the upper end of cylinder 22. The cylinder 24 is further provided, at its lower end, with an annular shoulder 27 which fits loosely about the lower end of inner cylinder 22. The bait 28 is placed within the inner cylinder. The inner and outer cylinders being transparent permit the rats or other animals which it is desired to trap to see the bait. As is well known, rats have a tendency to travel on beams or similar structures extending across a space. For this reason, the rats will readily follow the beam composed of the sections 13 and 14 in order to reach the bait within the receptacle 21. As the rat approaches the inner end of the beam section the beam will tilt so as to discharge the rat into the interior of casing A, in the manner above set forth. It is an important feature of this device that the sections of the beam are positioned so as to extend across the central portion of the casing, and the beam sections and plates 8 and 10 are smooth so as to present no projections which the rat could grasp and thus escape from the trap. In this connection, the construction of the bait receptacle is deemed of importance. This receptacle is constructed of two glass cylinders which are very smooth and are freely rotatable thus rendering it practicably impossible for a rat to grasp this member and escape, as the outer cylinder 24 is easily rotatable and cannot be easily grasped.

It will be evident, of course, that the weights 10, 17, and 20 are sufficient to maintain the elements to which they are secured in proper operative position normally, while permitting easy displacement of these elements when an animal advances upon either of the beam sections and is discharged into the receiving hopper. To prevent possible interference with the operation of beam section 13 or plate 8, I provide a sheet metal housing 29 secured to side wall 5 of the casing and inclosing the weights 10 and 17. To permit ready removal of the trapped animals from the casing, I provide a door 30 in the side wall 12. This door extends the full width of the casing and is hingedly secured at one end to the back wall 31. A turn-button 32 is mounted on the end of front wall 1 for the purpose of normally securing door 30 in closed position.

What I claim is:

A bait receptacle for traps comprising an inner cylinder adapted to be rotatably secured to a tiltable beam member of a trap, and an outer cylinder concentric with, and rotatably connected to, the said inner cylinder.

In testimony whereof I affix my signature in presence of two witnesses.

JOHN STOCKTON BEALLE.

Witnesses:
M. E. JONES,
JESSIE W. BOHRER.